Dec. 22, 1942.  G. J. CROSMAN, JR  2,306,205
APPARATUS FOR PRESSURE MOLDING
Filed Nov. 13, 1940  2 Sheets-Sheet 1
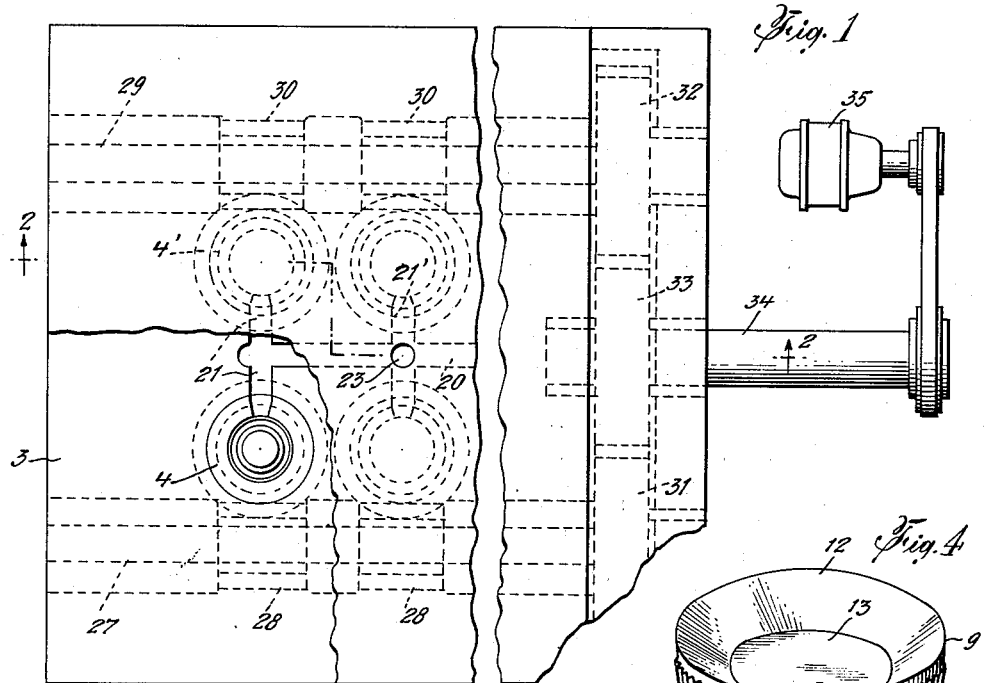
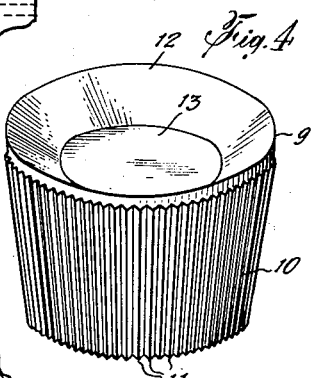
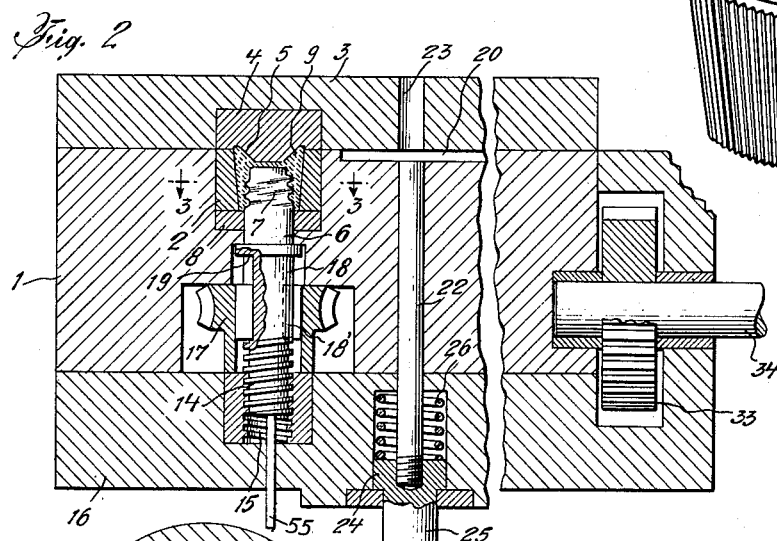
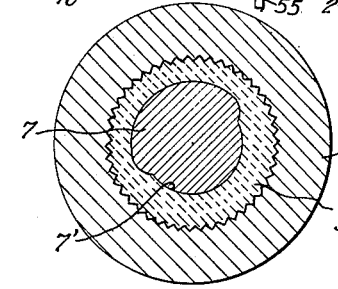
INVENTOR.
GEORGE J. CROSMAN, JR.
BY Dec. 22, 1942.                G. J. CROSMAN, JR                    2,306,205
                          APPARATUS FOR PRESSURE MOLDING
                          Filed Nov. 13, 1940            2 Sheets-Sheet 2

INVENTOR.
GEORGE J. CROSMAN, JR.
BY

Patented Dec. 22, 1942

2,306,205

UNITED STATES PATENT OFFICE 2,306,205

APPARATUS FOR PRESSURE MOLDING

George J. Crosman, Jr., Bradley Beach, N. J., assignor to Plastics, Inc., Monmouth County, N. J., a corporation of New Jersey Application November 13, 1940, Serial No. 365,433

3 Claims. (Cl. 18—34)

This invention is directed to an apparatus adapted particularly for the pressure molding of thermoplastic materials which, if desired, may be thermo-setting for the purpose of forming molded articles having internal threaded portions or similar projections.

It has become quite common to mold thermoplastic materials to form such articles as bottle caps, and various apparatus for producing the same have been previously proposed. However, in view of present conditions, under which it is necessary to have rapid and accurate production of large numbers of articles, the apparatus previously used for the purpose was defective in a number of respects.

Among the devices previously used for the purpose was a mold consisting essentially of a mold block or body having a plurality of cavities formed therein, and also having a mold top or platen having complementary portions whereby the complete cavities for the formation of the desired shape of bottle cap were formed. There was also provided a core member within the block for each of the cavities, said core member having that portion which enters the cavity threaded. After the molding operation was completed, in order to remove the molded caps, it was necessary to first lift off the platen from the block and then cause a longitudinal movement of the core which projected the molded cap into the space between the upper and lower platens. Thereafter, it was necessary to break the flash and by a special tool, or even by hand, to unscrew the caps from the cores. In a modern mold, having a large number of cavities, this was a relatively long and tedious operation, thus greatly reducing the quantity of caps capable of being produced in the mold. Furthermore, because of the construction of the mold, it was particularly difficult to gain access to the caps in the inner portion of the mold and the removal thereof was very difficult and slow.

In another form of apparatus for this purpose, there was provided a mold body or block containing a plurality of cavities. There was also provided a top portion or platen containing a depending core for each cavity, the lower end of said core being threaded to produce a threaded inner portion in the cap. Assembled between the two platens was a stripper plate which closely fitted around the neck of each core, but allowed free passage of the core through the openings in the stripper plate. After the caps were molded, the mold was opened by upwardly moving the upper platen containing the cores whereby the cores and threaded-on caps were raised up out of the mold block. By the further upward movement of the top platen, the cores were caused to move further until the lower edges of the caps engaged the stripper plate and further movement of the cores caused a forcible stripping off of the caps from the cores by contact of the caps with the edges of the stripper plate openings. This was highly disadvantageous, in that very few materials could be used for making the caps which would withstand such a treatment without also stripping the threads or chipping the edges of the caps or cracking the same. Furthermore, if deep threads are desired on the caps, as is usually the case, this procedure could not be used at all.

The present invention is intended and adapted to overcome all of the difficulties and disadvantages heretofore encountered in the rapid and accurate manufacture of internally threaded caps or the like, it being among the objects of the present invention to provide an apparatus which is unitary and in which substantially all of the operating parts are self-contained, and which is capable of substantially automatic operation.

It is also among the objects of the present invention to provide an apparatus which is adapted for the rapid ejection of the molded caps or the like and also to allow the equally rapid resetting of the apparatus in position for the next molding operation.

It is further among the objects of the present invention to provide an apparatus which makes the operation thereof quite simple, which avoids the possibility of breakage of articles in removing the same from the mold, and which does not require highly skilled or specialized workers for any of the operations.

It is still further among the objects of the present invention to provide a construction which is sturdy and simple, and in which the replacement and the repair of parts may be readily accomplished by the ordinary mechanic with a few ordinary tools.

In practicing the present invention, I provide a mold block having a plurality of cavities therein in suitable arrangement, a number of such cavities being interconnected by a passageway, generally on the face of said block. As usual, a mold top is fitted onto the block. Within each of the cavities is a spindle having the end which projects into the cavities suitably threaded, said spindle being mounted in the block for both rotation and translation. The face of each cavity is provided with means whereby upon rotation of the spindle within the molded cap, rotation of the cap is prevented. Usually, this is accomplished by roughening the inner surface of the cavity, as for example, by making the same angular or by a series of striations usually longitudinal in position. These may take the form of anchoring grooves or the like. Thereby, after the molding operation is complete and the top of the mold is removed, the spindle is caused to rotate and at the same time is retracted so that it is entirely removed from within the cap while the latter retains its initial position within the cavity.

There is also provided a novel means for ejecting a set of caps from the mold. This is accomplished by providing an ejector member within the mold block, said body consisting of a rod or the like having suitable means for retracting the same, as for example a spring, and held thereby in position just below the passageway in the mold block through which the thermoplastic material flows during the operation. Preferably, the ejector member is located centrally so that when it is operated, the pressure thereof on the solidified material in the passageway is transmitted with equal force to all of the cavities and thus a substantially uniform force is used to lift all of the caps from the cavities. This tends to insure the lifting or removal of all the caps without breakage of the interconnecting material or sprues.

In the accompanying drawings, constituting a part hereof, and in which like reference characters indicate like parts;

Fig. 1 is a front view of a mold having six cavities therein arranged in two rows of three each, and embodying the present invention;

Fig. 2 is a vertical cross-sectional view taken along the line 2—2 of Fig. 1, showing most of the operating parts of the apparatus, some parts being shown in elevation for clearness;

Fig. 3 is a fragmentary, horizontal, cross-sectional view taken through the molded cap along the line 3—3 of Fig. 2;

Fig. 4 is a perspective view of a cap molded by the apparatus disclosed herein;

Figure 6:
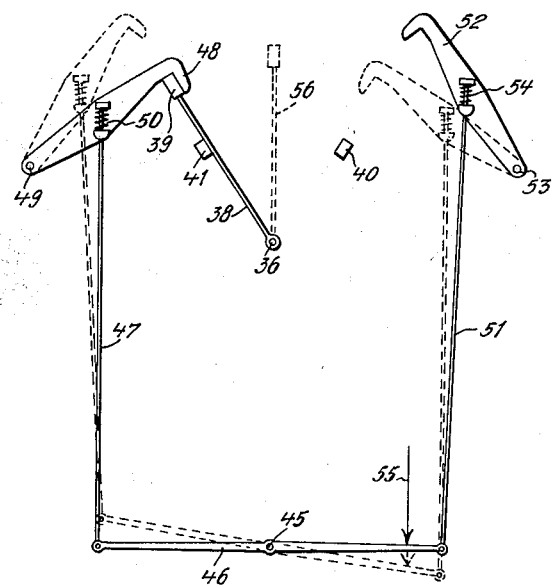
Fig. 6 is a diagrammatic view showing a modified form of switching arrangement which is operated automatically.

The mold body or block 1 has a series of inserts 2 in the upper surface thereof constituting mold cavities. The mold top 3 has a series of inserts 4 with depending portions 5 cooperating with inserts 2 to complete the cavities for the bottle caps. A spindle 6 has its upper end 7 threaded and projecting into the cavity through an opening in bottom member 8 thereof. The cap 9 which is formed in said cavity has a tapered outer surface 10 with longitudinal flutes 11 and dished top 12 having a central flat portion 13.

The lower end of spindle 6 is provided with threads 14 cooperating with corresponding threads 15 having the same pitch as threads 7, the threads 15 being part of an insert held in the bottom 16 of the mold. A worm gear 17 around the central portion of spindle 6 is held thereto for sliding engagement by the cooperation of keyway 18 and key 18'. A shoulder 19 on spindle 6 is adapted to contact with a similar shoulder on mold block 1 to limit the upward movement of spindle 6. A passageway 20 is formed in the upper surface of block 1 and has branches 21 and 21' leading to and communicating with each of the cavities 9. A rod 22, vertically placed in block 1, has its upper surface 23 normally flush with the lower surface of passageway 20 and located at a point approximately symmetrically placed with respect to all of the cavities of the mold. The lower end of rod 22 is held in block 24 within the bottom 6 of the mold, and a projection 25 therefrom allows movement to be imparted to rod 22. A spring 26 normally holds said rod in retracted position, as shown in Fig. 2.

A shaft 27 held in block 1 has a series of worms 28 cooperating with the respective worm gears 17. A similar shaft 29 has worms 30 cooperating with similar gears 17 on the opposite set of spindles. Spur gears 31 and 32 are secured to shafts 29 and 27, respectively and a cooperating spur gear 33 has a shaft 34 adapted to be moved by any suitable source of power, such as motor 35.

Figure 5:
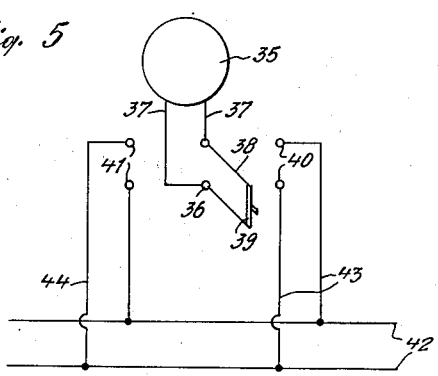
Fig. 5 is a wiring diagram showing the operation of the motor.

There may be provided a double pole double throw switch having a pair of center contacts 36 from which connections 37 are made to the motor. Switch blades 38 are pivoted thereon and are interconnected by insulating member 39. The switch blades are either made of spring metal or are so mounted that normally they would be biased into the neutral or open position. A pair of contacts 40 on one side of the switch and a similar pair of contacts 41 on the other side of the switch are connected to power line 42 by sets of connections 43 and 44 respectively. As will be seen from Fig. 5, connections 43 and 44 are adapted to reverse the polarity.

In Fig. 6 there is shown a diagrammatic view of a similar switch with means for locking the blades 38 in operative positions and means for automatically releasing the same to the neutral position. Pivoted at 45 is a lever 46 having a link 47, the free end of which is held in latch 48 pivoted at 49. A spring 50 allows movement of latch 48 independently of link 47. The opposite side of lever 46 has a link 51, the free end of which is mounted in latch 52, pivoted at 53. A spring 54 in latch 52 allows independent movement thereof relative to link 51. There is diagrammatically shown a member 55 which may be attached to or operated by the lower end of spindle 6.

The operation of the apparatus is as follows: The mold is closed and placed in a suitable press where thermoplastic material, at a relatively high temperature and pressure, is forced through passageway 20 and branches 21 and 21' into each of the cavities, thus forming the bottle caps. Upon the release of the pressure, the mold top 3 is removed, the handle 39 of the double pole switch is thrown to the right to contact with members 41, and the same is held in said position. This causes rotation of spindles 6 and a retraction of thread 7 from the molded caps 9. After the release of the caps has been accomplished, pressure is applied to block 25, forcing rod 22 upwardly against the solidified material in the passageways, thus raising such solidified material and all of the caps 9 simultaneously from the mold. Handle 39 is then released and the blades 38 then assume the central or neutral position. The entire unit may then be readily removed by hand and the caps broken away from the connecting material. The mold may then be closed and it is ready for another operation.

In Fig. 6 I have shown a modification wherein the switch is automatically operated by the movement of the spindle 6. After a molding operation, the mold top is removed, the switch being in the position shown in dotted lines 56. Handle 39 is moved to the left and is engaged by latch 48, which holds it in place. The contact causes rotation of the motor, retraction of the spindle and movement downwardly of member 55, which presses upon the right side of lever 46, lowering the same into the dotted position shown. This raises latch 48 and releases handle 39, thereby breaking the motor circuit and stopping the same as the spindle reaches its lower position. When it is desired to return the spindle into its operative position, the handle 39 is moved to the right where it engages latch 52 shown in the dotted position. This closes the motor circuit and causes a reverse movement of the spindle, the member 55 rising upwardly and causing lever 46 to assume the horizontal position. This raises latch 52, releases handle 39 and the switch is now in neutral position 56. In order to make the operation fully automatic, it is feasible to connect handle 39 to the mold top in such a manner that when such top is removed from the mold it throws the switch to the left into contacts 41, and when the mold top is returned onto the mold, it throws the switch handle to the right into contacts 40.

It will be noted that the apparatus is quite simple in construction and rapid and precise in its operation. The ejection of the caps is made certain and easy without any danger of breakage of any of the molded articles. The construction of the apparatus is sturdy and replacement of the parts may be readily accomplished. The entire apparatus is compact and self-contained, and it is capable of automatic operation.

Although I have described my invention setting forth a single embodiment thereof, it is obvious that various modifications may be made in the construction within the spirit of the invention. Various parts shown on the drawing may be eliminated and other parts may be replaced by equivalent structures, as will be apparent to those skilled in the art. Therefore, the invention is to be broadly construed and not to be limited except by the character of the claims appended hereto.

What I claim is:

1. Apparatus for pressure molding thermoplastic materials to form articles having internal threaded portions comprising a mold block having a flat upper surface and a series of spaced cavities extending downwardly below said surface, said cavities tapering downwardly from the upper surface of said block and adapted to form molded caps having undercut faces, a passageway in said surface of said block for said material having branches communicating with said cavities, a substantially flat mold top fitted on said block surface and having extending portions fitting into the upper portion of said cavities when the mold is closed to provide depressions in the tops of said caps, a vertically disposed spindle in each cavity in said block having threads on one end extending into a central portion of said cavity, said spindle being rotatably mounted in said block, and longitudinal downwardly and inwardly extending corrugations on the face of said cavity to prevent rotation of a molded article upon rotation of said spindle, the other end of said spindle being threaded and fitted into a threaded portion of said block, said spindle being adapted upon the rotation thereof to move longitudinally to retract the same from said article, a motor for rotating and retracting said spindle and means operated by contact with said spindle for automatically stopping said motor at the lower end of the path of said spindle.

2. Apparatus for pressure molding thermoplastic materials to form articles having internal threaded portions comprising a mold block having a flat upper surface and a series of spaced cavities extending downwardly below said surface, said cavities tapering downwardly from the upper surface of said block and adapted to form molded caps having undercut faces, a passageway in said surface of said block for said material having branches communicating with said cavities, a substantially flat mold top fitted on said block surface and having extending portions fitting into the upper portion of said cavities when the mold is closed to provide depressions in the tops of said caps, a vertically disposed spindle in each cavity in said block having threads on one end extending into a central portion of said cavity, said spindle being rotatably mounted in said block, and longitudinal downwardly and inwardly extending corrugations on the face of said cavity to prevent rotation of a molded article upon rotation of said spindle, the other end of said spindle being threaded and fitted into a threaded portion of said block, said spindle being adapted upon the rotation thereof to move longitudinally to retract the same from said article, a motor for rotating and retracting said spindle, a double-throw switch for closing the circuit of said motor at the end of a molding operation, means operated by contact with said spindle for automatically opening said circuit at the lower end of the path of said spindle, said switch being adapted to cause rotation of said motor in the opposite direction to raise said spindle.

3. Apparatus for pressure molding thermoplastic materials to form caps having internal threaded portions comprising a mold block having a flat upper surface and a series of spaced cavities extending downwardly below said surface, said cavities tapering downwardly from the upper surface of said block and adapted to form molded caps having undercut faces, a passageway in said surface of said block for said material having branches communicating with said cavities, a substantially flat mold top fitted on said block surface and having protruding portions fitting into the upper portion of said cavities when the mold is closed to provide depressions in the tops of said caps, longitudinal grooves in the walls of said cavities adapted to form longitudinal ribs on the sides of said caps, a plurality of parallel spindles having threads on the ends thereof, said ends extending into said cavities on the side thereof opposite to said extending portions, said spindles being rotatably mounted in said block, a portion of each spindle being threaded and fitted into a threaded portion of said block, said spindle being adapted upon the rotation thereof to move longitudinally to retract the same from said article, an ejector mounted in said block having one end at said passageway, the movement of said ejector adapted to simultaneously remove all of said caps from said cavities when the mold is open and the spindles are retracted, a motor for rotating and retracting said spindles, a double throw switch for closing the circuit of said motor at the end of a molding operation, means operated by contact with said spindle for automatically opening said circuit at the lower end of the path of said spindles, said switch being adapted to cause rotation of said motor in the opposite direction to raise said spindles.

GEORGE J. CROSMAN, Jr.